Patented June 2, 1942

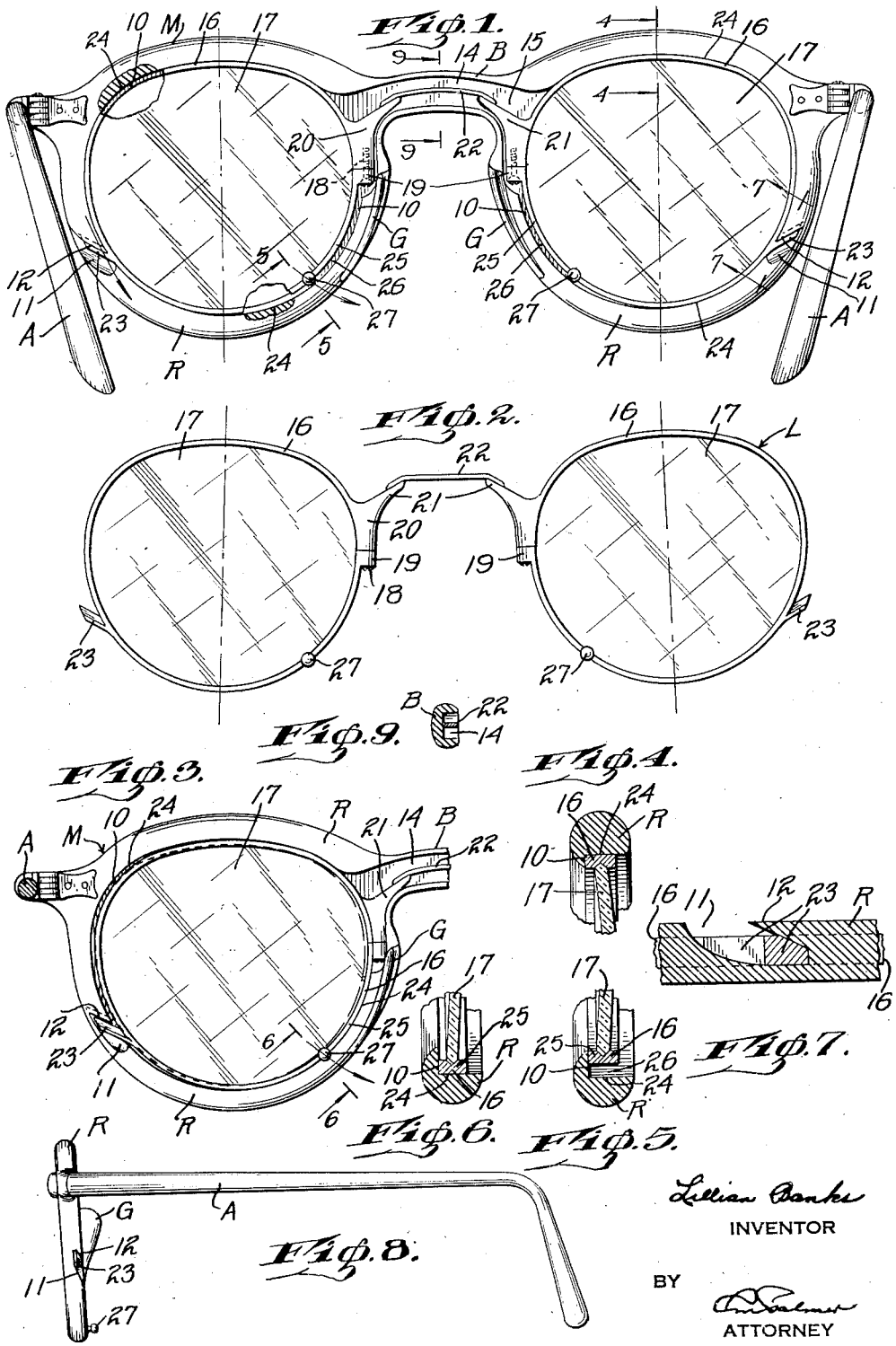

2,284,630

UNITED STATES PATENT OFFICE 2,284,630

COMPOSITE OPTICAL CARRIER

Lillian Banks, New York, N. Y., assignor of one-third to Charles M. Palmer, Washington, D. C., and one-third to John Richard Iander, Brooklyn, N. Y.

Application May 31, 1940, Serial No. 338,263

9 Claims. (Cl. 88—41)

The present invention deals with an ophthalmic mounting for removably supporting a pair of spectacles similar to a pair of oxfords. The present trend in fashions is directed to harmonizing wearing ensembles. Hitherto little if any attention has been given to harmonizing or to complement ensembles with eyeglass mounts. The principal object of the invention is to satisfy this purpose. Another object of the invention resides in the provision of a master spectacle carrier interchangeably and severally associated with a plurality of ophthalmic mounts each complemental to a respective wearing ensemble. Other important objects, advantages, and functional and structural features of the invention will be more readily understood from the teachings of the following detailed description considered in the light of the accompanying drawing wherein:

Fig. 1 is a posterior elevational view showing the ophthalmic mounting removably sustaining and locking a pair of spectacles similar to oxfords and herein referred to as the master lens carrier.

Fig. 2 illustrates a posterior elevational view of the master lens carrier.

Fig. 3 is a fragmentary view of Fig. 1 but illustrating a rim of the master lens carrier shifted to its unlocked position prior to removal thereof from the ophthalmic mounting.

Fig. 4 is a sectional view on the line 4—4 of Fig. 1.

Fig. 5 is a sectional view on the line 5—5 of Fig. 1 but showing the position of the lower portion of one of the rims of the master lens carrier when in a locking relation with the mount.

Fig. 6 is a sectional view on the line 6—6 of Fig. 3, illustrating the lower part of a rim of the master lens carrier when in an unlocking relation with the mount.

Fig. 7 is an enlarged sectional view on the line 7—7 of Fig. 1.

Fig. 8 is a side view of Fig. 1, and

Fig. 9 is a sectional view on the line 9—9 of Fig. 1.

Illustrative of the embodiment disclosed, the ophthalmic mount is generally denoted M and constitutes a frame comprising a pair of rims R integrally merged with the bridge B.

Each rim R comprises the rearwardly extending and arcuate nose guard G and each carries a swingable arm A adapted to hook over the ears of the wearer as is well understood.

The hollow rims R each embody a substantially annular vertical positioning shoulder 10 and the outer side portions of each rim is provided with a biased notch or socket 11 defining the projecting keeper 12.

The arched bridge B is provided with the longitudinal groove 14 which extends in both directions to each rim interrupting each of the latter to define relatively large passageway 15.

Removably seated in the frame or mount M is the master lens carrier or frame L which comprises the spaced relatively thin split rhodium metal rims 16 each carrying an ophthalmic lens 17 and each rim may be adjusted about its respective lens by the threaded set screw 18 fitted into companion lugs 19 and 20, each of the latter having a finger or support 21 to which the bent terminals of the flexible and sensibly resilient and normally substantially flat leaf spring 22 is secured.

Extending laterally of each rim 16 is a tapered lip or dog 23 adapted to be received in a companion tapered slot or socket 11 of an associated rim R of the mount and the resilient action of leaf spring 22 is such as to normally urge the upper portion of a rim 16 against the upper part of the adjacent substantially annular shoulder 24 of the mount or frame M thus holding lip 23 raised and locked behind the catch or keeper 12.

Where the lips 23 have been inserted behind the keeper 12, the master lens carrier L and particularly the rims 16 of the latter will be locked in each rim R of the mount although at such time the lower parts 25 of each rim 16 are spaced from the annular shoulder 24 of the latter leaving the gap 26 (Figs. 1 and 5) whereby the lower parts 25 of the rims 16 can be moved towards the guards G and arcuately as indicated by the arrow across one of the knobs 27 in Fig. 1 and these knobs of course are fixed to the rims 16 and serve as means to actuate the latter from a locked relation with the rims of the mount to an unlocked relation.

If the knobs in Fig. 1 be manually shifted towards the guards G, this action causes lips 23 to be moved downwardly in slots 11 to be ultimately clear of the locking keepers 12 (Fig. 3) in which instant the lower portion of each rim 16 is against the lower part of shoulder 24 (Fig. 6) thus closing gap 26 although at this time an upper portion of each rim 16 is away from an upper part of the shoulder 24 (Fig. 3).

With the rims 16 of the master lens carrier L unlocked from the rims R of the mount M, the carrier may be bodily and conveniently removed from the mount and when so removed (Fig. 2) leaf spring 22 recoils, losing its tension in which instant the rims 16 are lifted outwardly and upwardly by the leaf spring and the crown of the latter becomes substantially flat.

Where it is desired to insert the master lens carrier into the mount, leaf spring 22 is inserted into gap 14 in the bridge B and the upper portions of rims 16 are positioned against the upper portions of the annular shoulders 24 after which knobs 27 are moved towards each other. This action moves rims 16 towards each other and causes leaf 22 to flex or become under tension providing a fairly pronounced arcuately shaped crown portion at the upper part thereof (Fig. 1).

Having flexed the leaf spring, lips 23 are in a position clear of the keepers 12. Therefore these lips may be readily inserted into sockets 11 after which manual pressure is removed from the knobs 27. Thereafter the leaf spring releases its energy, automatically lifting lips 23 behind the keeper 12. In such relation each of the rims 16 is properly positioned and locked in the rims of the mount and thus the lens carrier is properly assembled with the mount and in such relation, leaf spring 22 constantly urges the rims 16 of the lens carrier against the outer and upper part and a part of the lower portion of the shoulders 24 or in other words in the assembled relation of the mount and carrier the leaf spring is under tension and exerts an outward and upward thrust on each of the rims 16 hence holding the latter yieldingly but frictionally against a major part of the shoulders 24, and such relation is maintained to prevent accidental transverse displacement of the rims 16 relative to the rims R of the mounts by the removable interlocking action of the lips 23 with the keepers 12.

According to the invention only one master lens carrier is necessary for a plurality of mountings M of the type shown in Fig. 1 and the plurality of mountings may be in a variety of colors each desirably harmonizing or complemental to the color of a particular ensemble of the wearer. Hence with the present invention a master lens carrier is common to a plurality of mounts each of which is adapted to removably receive and sustain the master lens carrier interchangeably and severally associated with the plurality of colored mountings.

While the invention has been specifically described in detail, it is to be understood that it is not limited to specific details described but it is capable of other adaptations and modifications within the scope of the appended claims.

I claim:

1. In combination, a mount comprising spaced rims and a hollow bridge interconnecting said rims, swingable arms carried by said rims, a carrier comprising spaced lenses removably receivable in said rims, a sensibly resilient spring removably receivable in said bridge and resiliently sustaining said lenses in said rims whereby said carrier yieldingly abuts said rims, and means for removably locking said carrier to said rims.

2. In combination, a mount comprising spaced rims and a hollow bridge interconnecting said rims, swingable arms carried by said rims, a carrier comprising spaced lenses removably receivable in said rims, a sensibly resilient and flexible bridge removably receivable in said first mentioned bridge and sustaining said lenses whereby peripheral faces of said carrier disengageably abut the inner faces of said rims, and means for removably locking said carrier to said rims.

3. In combination, a mount comprising spaced rims and a bridge interconnecting said rims, swingable arms carried by said rims, a carrier comprising spaced lenses removably receivable in said rims, a flexible spring sustaining said lenses and removable within said bridge for urging said carrier to disengageably abut the inner faces of said rims, and means for removably locking said carrier to said rims.

4. In combination, a mount comprising spaced rims and a hollow bridge interconnecting said rims, keepers on said rims, swingable arms carried by said rims, a carrier comprising spaced lenses removably receivable in said rims, a leaf spring removably receivable in said bridge and resiliently sustaining said lenses, and means extending from said carrier for removably interlocking with said keepers.

5. In combination, a mount comprising spaced and substantially annular means and a hollow bridge interconnecting said annular means, swingable arms carried by said annular means, a carrier comprising spaced lens supporting rims removably receivable in said annular means, sensibly resilient means removably receivable in said bridge and sustaining said rims to cause said carrier to frictionally engage inner faces of said rims, and means for removably locking said rims in said annular means.

6. In combination, a mount comprising spaced and substantially annular means and a hollow bridge interconnecting said annular means, swingable arms carried by said annular means, a carrier comprising spaced lens supporting rims removably receivable in said spaced annular means, a leaf spring removably receivable in said bridge and sustaining said rims for urging peripheral portions of said carrier in removable engagement with inner walls of said rims, and means for removably locking said rims in said annular means.

7. In combination, a mount comprising spaced and substantially annular means and a hollow bridge interconnecting said annular means, swingable arms carried by said annular means, a carrier comprising spaced lens supporting rims removably receivable in said annular means, a leaf spring removably receivable in said bridge and resiliently sustaining said rims and normally urging the latter at least in part against said annular means, and means for removably locking said rims in said annular means.

8. In combination, a mount comprising spaced and substantially annular means, keepers carried by said annular means, and a hollow bridge interconnecting said annular means, swingable arms carried by said annular means, a carrier comprising lens supporting rims removably receivable in said annular means, a leaf spring removably receivable in said bridge and sustaining said rims, and projections extending from said rims for removably interlocking with said keepers.

9. In combination, a mount comprising spaced and substantially annular means each having a biased notch and a keeper overhanging said notch, and a hollow bridge interconnecting said annular means, swingable arms carried by said annular means, a carrier comprising lens supporting rims removably receivable in said annular means, a leaf spring removably receivable in said bridge and sustaining said rims, and projections extending from and laterally of said rims for removably interlocking with said keepers.

LILLIAN BANKS.